US 8,714,566 B2

(12) United States Patent
Campbell et al.

(10) Patent No.: US 8,714,566 B2
(45) Date of Patent: May 6, 2014

(54) TOOL CHUCK WITH INDICATOR MECHANISM

(75) Inventors: David C. Campbell, Bel Air, MD (US); Christopher J. Murray, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 325 days.

(21) Appl. No.: 13/224,445

(22) Filed: Sep. 2, 2011

(65) Prior Publication Data

US 2012/0074656 A1 Mar. 29, 2012

Related U.S. Application Data

(60) Provisional application No. 61/386,802, filed on Sep. 27, 2010.

(51) Int. Cl.
*B23B 31/165* (2006.01)
*B23B 31/16* (2006.01)

(52) U.S. Cl.
CPC ................. *B23B 31/16045* (2013.01)
USPC ............................................. 279/62; 408/16

(58) Field of Classification Search
USPC ........... 279/62, 61, 60, 126, 125, 902; 408/16
IPC ....................................... B23B 31/65
See application file for complete search history.

(56) References Cited

U.S. PATENT DOCUMENTS

| 4,645,220 A * | 2/1987 | Hiestand ....................... 279/111 |
| 5,337,634 A | 8/1994 | Carnesi |
| 5,819,607 A | 10/1998 | Carnesi |
| 6,311,787 B1 | 11/2001 | Berry et al. |
| 6,513,604 B2 | 2/2003 | Hanke |
| 6,834,864 B2 * | 12/2004 | Girardeau ....................... 279/60 |
| 7,243,922 B2 | 7/2007 | Gibbons |
| 7,243,923 B2 | 7/2007 | Campbell et al. |
| 7,503,734 B2 | 3/2009 | Puzio |
| 7,520,512 B2 | 4/2009 | Campbell et al. |
| 2009/0072501 A1 * | 3/2009 | Young ............................ 279/62 |
| 2009/0126956 A1 | 5/2009 | Trautner |
| 2010/0043603 A1 | 2/2010 | McRoberts et al. |

FOREIGN PATENT DOCUMENTS

| GB | 2381485 A | 5/2003 |
| JP | 64002803 A * | 1/1989 |

* cited by examiner

*Primary Examiner* — Andrea Wellington
*Assistant Examiner* — Alan Snyder
(74) *Attorney, Agent, or Firm* — Harness, Dickey & Pierce, P.L.C.

(57) ABSTRACT

A power tool constructed in accordance to one example of the present teachings can include a housing having a handle and body portion. A motor can be disposed in the body portion and a drive spindle drivingly connected to the motor. A chuck can comprise a chuck spindle that supports a plurality of chuck jaws. A first sleeve can rotationally communicate with the chuck jaws to move the chuck jaws between a clamping position and a non-clamping position. An indicator mechanism can be disposed on the chuck having a first and second visual indicator. The indicator mechanism can move from a first position to a second position upon rotation of the first sleeve to a location that corresponds to a predetermined clamping force attained by the chuck jaws.

19 Claims, 4 Drawing Sheets

TOOL CHUCK WITH INDICATOR MECHANISM

CROSS-REFERENCE TO RELATED APPLICATIONS

This application claims the benefit of U.S. Provisional Application No. 61/386,802, filed on Sep. 27, 2010. The entire disclosure of the above application is incorporated herein by reference.

FIELD

The present disclosure relates generally to a drill chuck for use with a power drill and more specifically to an indicator mechanism incorporated on the drill chuck that changes status thereby conveying to a user when a tool, such as a drill bit has been sufficiently clamped.

BACKGROUND

This section provides background information related to the present disclosure which is not necessarily prior art.

Drill chucks can be used in conjunction with power drills for releasably engaging various tools, such as drill bits and the like. Conventional drill chucks can also require a special tool for tightening and loosening the drill chuck onto the tool. Recently, drill chucks have been designed to be tightened by hand wherein a user can rotate a chuck sleeve of the drill chuck to cause the jaws of the drill chuck to engage and disengage the tool. The user of the power drill must rotate the adjustable chuck sleeve with one hand while holding a tool inside the jaw members until the tool is locked in place. In some examples, it may be difficult for a user to ascertain whether the tool has been sufficiently clamped.

SUMMARY

This section provides a general summary of the disclosure, and is not a comprehensive disclosure of its full scope or all of its features.

A power tool constructed in accordance to one example of the present teachings can include a housing having a handle and body portion. A motor can be disposed in the body portion and a drive spindle can be drivingly connected to the motor. A chuck can comprise a chuck spindle that supports a plurality of chuck jaws. A first sleeve can rotationally communicate with the chuck jaws to move the chuck jaws between a clamping position and a non-clamping position. An indicator mechanism can be disposed on the chuck having a first and second visual indicator. The indicator mechanism can move from a first position to a second position upon rotation of the first sleeve to a location that corresponds to a predetermined clamping force attained by the chuck jaws.

The indicator mechanism can further comprise a plate that is keyed for rotation with the chuck spindle and that is fixed for movement with the first and second visual indicators. The plate can have a tab extending therefrom that couples with the visual indicator. The chuck can further comprise a second sleeve that is axially offset relative to the first sleeve and that defines a window for viewing the visual indicator member.

According to additional features, the indicator mechanism can further comprise a compression member that is movable between an uncompressed position and a compressed position. The compression member can be disposed between a support wall of the second sleeve and the tab of the plate. Movement of the indicator mechanism from the first position to the second position can correspond to movement of the compression member from the uncompressed position to the compressed position. The compression member according to one example can be a Belleville washer. The first visual indicator can be a first color and the second visual indicator can be a second color that is distinct from the first color. According to one example, the first and second visual indicators can be formed on a unitary visual indicator member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
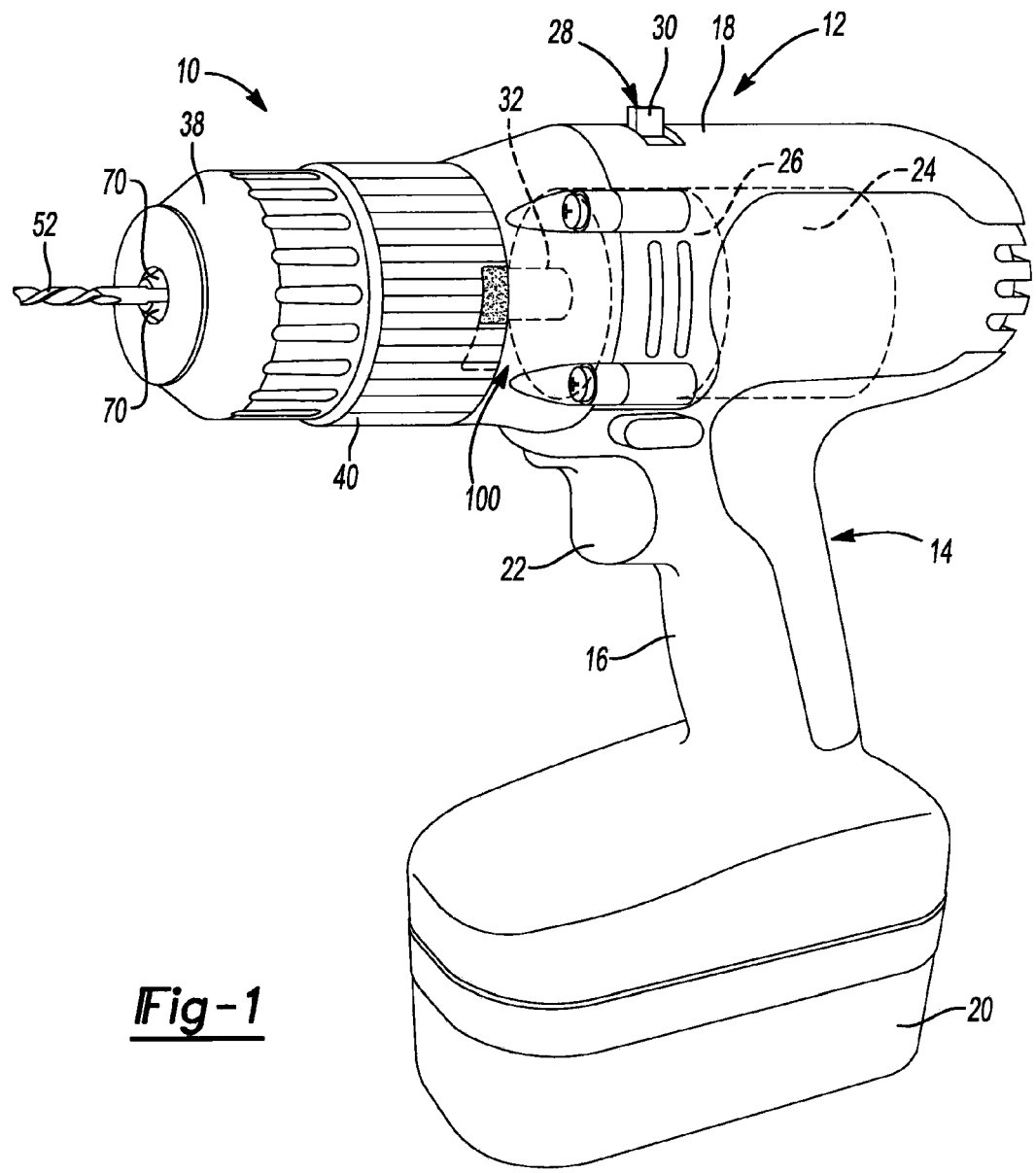
FIG. 1 is a perspective view of an exemplary drill that incorporates a drill chuck having an indicator mechanism constructed in accordance to one example of the present teachings.

With initial reference to FIG. 1, a drill chuck constructed in accordance to one example of the present teachings is shown and generally identified at reference numeral 10. The drill chuck 10 is shown operatively associated with an exemplary drill 12 that can have a housing 14 including a handle portion 16 and a body portion 18. The exemplary drill 12 can include a battery pack 20 that can be releasably attached to the handle portion 16. It will be appreciated however that while the exemplary drill 12 is shown in FIG. 1 as a cordless battery powered drill, the principles of the drill chuck 10 disclosed herein can also be applicable to other drill configurations, such as corded drills.

A trigger 22 can be provided on the handle portion 16 for selectively providing electric current from the battery pack 20 to a motor 24 provided within the body portion 18 of the housing 14. A multi-speed transmission device 26 can be drivingly connected to the motor 24. The multi-speed transmission device 26 can be provided with a shift mechanism 28 that includes a shift lever 30. The shift lever 30 can be movable by an operator to change the gear ratio of the multi-speed transmission device 26. The multi-speed transmission device 26 can include a drive spindle 32 that is connected to the drill chuck 10. Those skilled in the art will appreciate that other device may be incorporated into the drill 12, such as a hammer drill mechanism or other features that can be utilized in combination with the drill chuck 10 without departing from the scope of the present disclosure.

Figure 2:
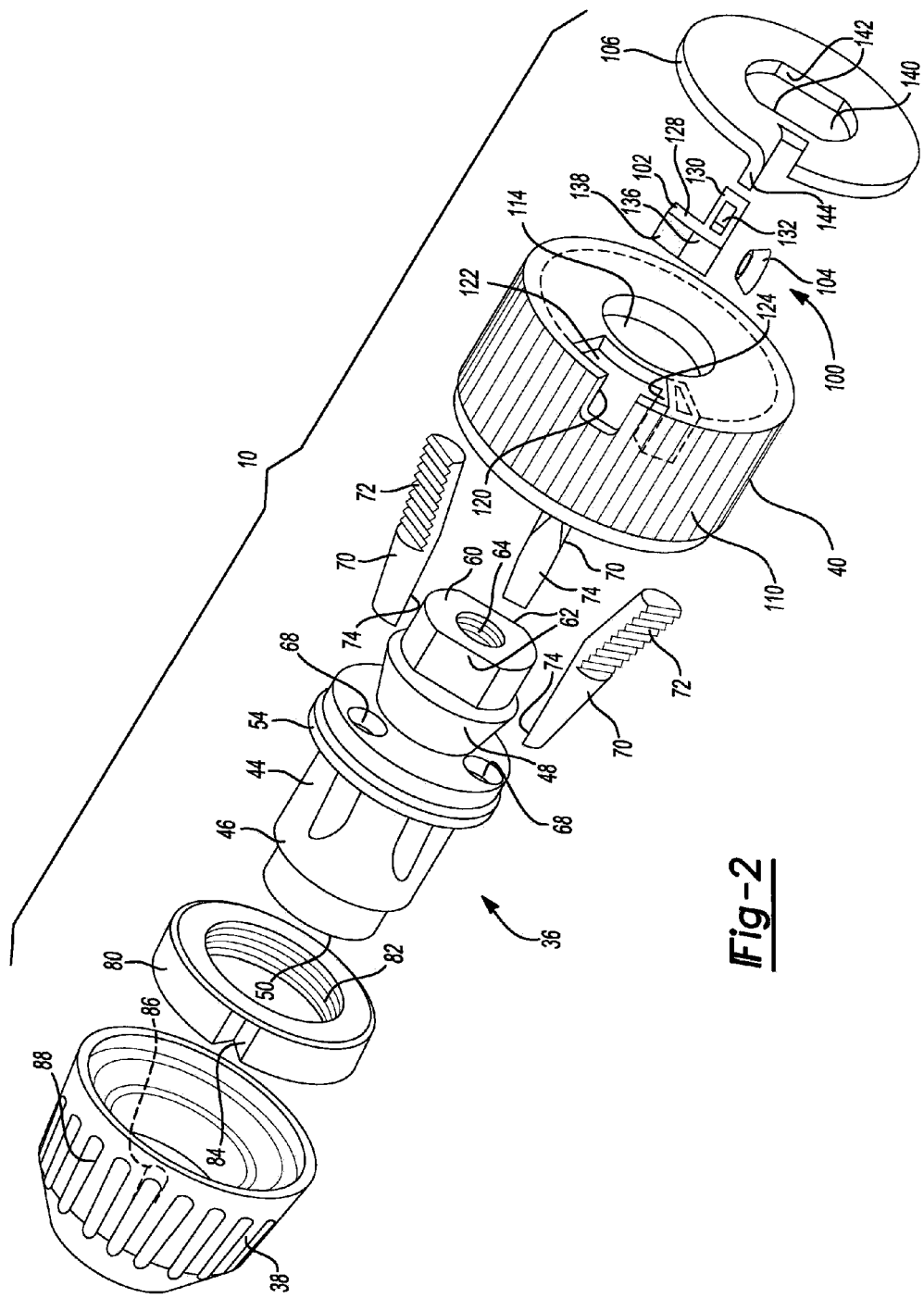
FIG. 2 is an exploded view of the drill chuck of FIG. 1.

With continued reference to FIG. 1 and additional reference now to FIG. 2, the drill chuck 10 will be described in greater detail. The drill chuck 10 can generally include a chuck spindle 36, a front sleeve 38 and a rear sleeve 40. The chuck spindle 36 can include a core body 44 that has a forward section 46 and a rearward section 48. The forward section 46 can include a through hole 50 that can receive a drill bit 52 (FIG. 1) therein. The rearward section 48 can be offset from the forward section 46 by a collar 54. The rearward section 48 can include a hub 60 that has flats 62 formed thereon. The hub 60 can include threads 64 that can be adapted to be threadably engaged with the drive spindle 32 (FIG. 1).

The core body 44 can include guide channels 68 that can be configured to intersect the through hole 50 at an angle. A plurality of jaw members 70 can be received in the guide channels 68. Each jaw member 70 can be provided with a threaded surface 72 on an outward side and a gripping surface 74 on its forward inner surface.

A threaded nut 80 can surround the core body 44 and include a tapered threaded surface 82 in threaded engagement with the threaded surfaces 72 of the jaw member 70. The threaded nut 80 can have a notch 84 formed around its outer surface for engaging a finger 86 extending on an inner surface of the front sleeve 38. Rotation of the front sleeve 38 therefore, can result in concurrent rotation of the threaded nut 80. The front sleeve 38 can include a gripping surface 88 formed around an outer surface thereof.

The drill chuck 10 according to the present disclosure can further include an indicator mechanism 100. According to one example, the indicator mechanism 100 can be at least partially incorporated onto the rear sleeve 40 and further comprise a visual indicator member 102, a compression member 104 and a plate 106. As will be discussed herein, the indicator mechanism 100 can move from a first position (FIGS. 3 and 5) to a second position (FIGS. 4 and 6) to convey to a user that a tool, such as the drill bit 52 has been tightened to a satisfactory torque.

The rear sleeve 40 can include a gripping surface 110 around an outer circumference. The rear sleeve 40 can define an opening 114 for receiving the drive spindle 32. A viewing window 120 can be formed through the rear sleeve 40 to allow a user to view the visual indicator member 102. An access slot 122 and support wall 124 can be provided on the rear sleeve 40 for cooperating with the plate 106.

The visual indicator member 102 can generally comprise a body 128 having a connecting portion 130 that defined an opening 132 therein. The visual indicator member 102 can further include a first visual indicator 136 and a second visual indicator 138. The first and second visual indicators 136 and 138 can be constructed in any manner to convey to a user two distinct patterns or visual cues that correspond to two distinct operating conditions. In the example provided, the first visual indicator 136 is a red surface color and the second visual indicator 138 is a green surface color. The red surface color corresponds to the jaws 70 of the drill chuck 10 being in an unclamped operating state. The green surface color corresponds to the jaws 70 of the drill chuck 10 having been tightened into a clamped operating condition. Those skilled in the art will readily appreciate that the first and second visual indicators 136 and 138 may be constructed in any suitable manner that can visually convey to a user two distinct operating states.

The compression member 104 can be positioned between the support wall 124 of the rear sleeve and the body 128 of the visual indicator member 102. The compression member 104 can be operable to provide a predetermined resistive force between the visual indicator member 102 and the support wall 124 of the rear sleeve 40 as will described herein. In the exemplary embodiment disclosed herein, the compression member 104 can be a Belleville washer.

The plate 106 can define a keyed aperture 140 having flats 142 that cooperatively receive the flats 62 on the hub 60 of the chuck spindle 36. The plate 106, therefore, can be keyed for rotation with the chuck spindle 36. The plate 106 can further include a tab 144 extending therefrom. In one example, the tab 144 can extend at an orientation generally perpendicular to a plane of the plate 106. The tab 144 can be received by the opening 132 in the visual indicator member 102. The visual indicator member 102 therefore, can be configured to rotate with the plate 106.

Figure 3:
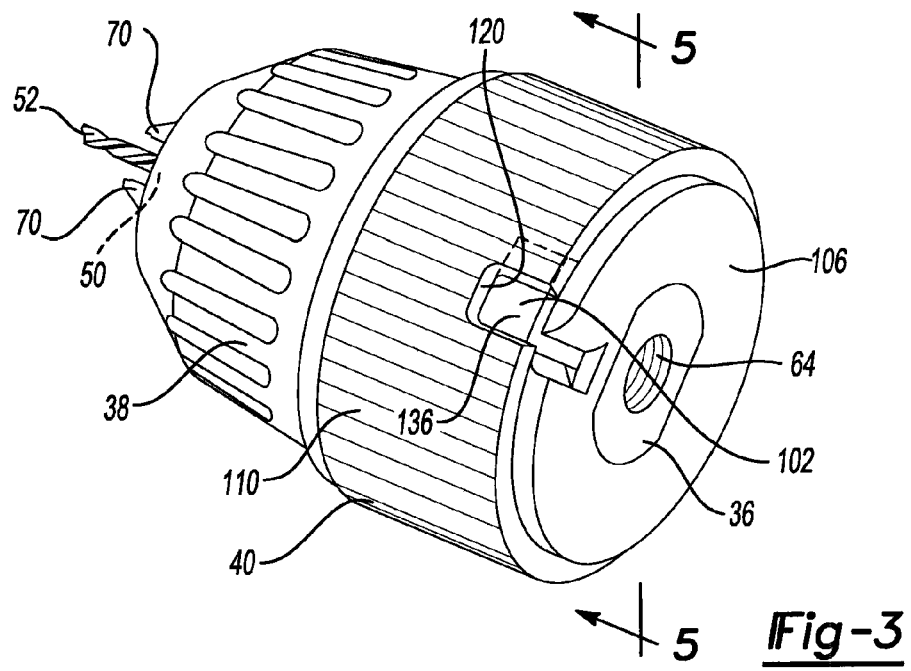
FIG. 3 is a rear perspective view of the drill chuck and shown with the indicator mechanism in a first position corresponding to an unclamped state.

With continued reference now to FIGS. 3-6, operation of the drill chuck 10 with the indicator mechanism 100 will be described in greater detail. As shown in FIG. 3, the drill bit 52 is initially placed into the center hole 50 provided in the forward section 46 of the core body 44 in the chuck spindle 36. It can be appreciated that the jaw members 70 are retracted sufficiently to allow clearance for the drill bit 52 to be inserted. It will also be appreciated that as the drive spindle 32 rotates in its operational direction, the core body 44 and the jaw members 70 will rotate therewith. Next, a user can grasp the rear sleeve 40 and maintain it in a relatively static position while rotating the front sleeve 38 in a tightening direction (counter-clockwise as viewed in FIG. 4). As the front sleeve 38 rotates, the threaded nut 80 will also rotate. Rotation of the threaded nut 80 can cause the tapered threaded surface 82 of the threaded nut 80 to threadably communicate along the threaded surface 72 of each of the jaw members 70, respectively. With the threaded nut 80 remaining axially fixed, the jaw members 70 are caused to translate through the guide channels 68 causing the gripping surface 74 of the jaw members 70 to move toward the axis of rotation and clamp down on the drill bit 52.

Figure 4:
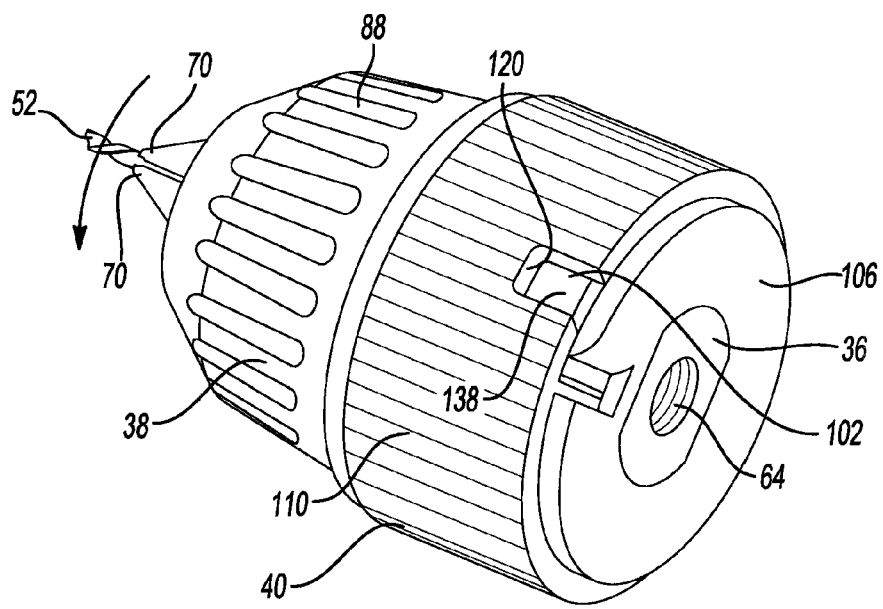
FIG. 4 is a rear perspective view of the drill chuck and shown with the indicator mechanism is a second position corresponding to a clamped state.

During tightening of the drill chuck 10 onto the drill bit 52, the indicator mechanism 100 will advance from a first position shown in FIG. 3 where the first visual indicator 136 is viewable through the viewing window 120 to a second position shown in FIG. 4 where the second visual indicator 138 is viewed through the viewing window 120. The visual indicator member 102 is caused to move from the first position (FIG. 3) to the second position (FIG. 4) once enough force is communicated from the tab 144 on the plate 106 against the compression member 104 (through the visual indicator member 102) to cause the compression member 104 to compress from a first position (FIG. 5) to a second collapsed position (FIG. 6). It will be appreciated that as the jaw members 70 progressively engage the drill bit 52, a resultant force is increasingly transferred onto the compression member 104. Once that force reaches a predetermined threshold, the compression member 104 can "snap" into the flat state shown in FIG. 6. It is appreciated that the "snapping" motion can also provide a user with an audible and tactile feedback conveying to the user of the clamped status. Again, the exemplary compression member 104 is in the form of a Belleville washer that can collapse from a generally conical form (FIG. 5) to a generally flat compressed state (FIG. 6) once enough compression force is exerted onto it. Once the visual indicator member 102 moves to the position shown in FIGS. 4 and 6, the second visual indicator 138 is revealed through the window 120 and the user is notified that the drill bit 52 has been clamped sufficiently.

Figure 5:
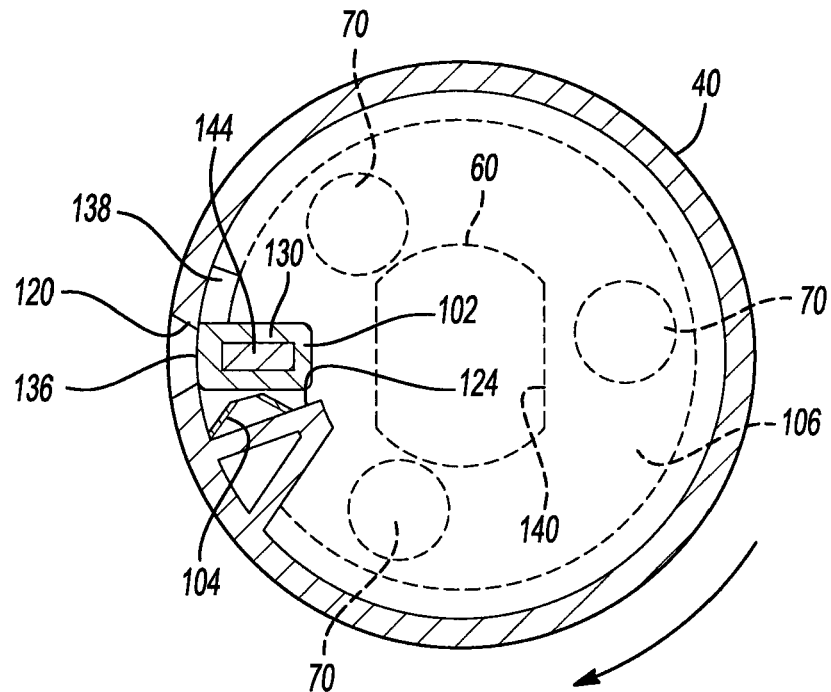
FIG. 5 is a cross-sectional view of the indicator mechanism taken along lines 5-5 of the FIG. 3 and shown with the indicator mechanism in the unclamped position.
Figure 6:
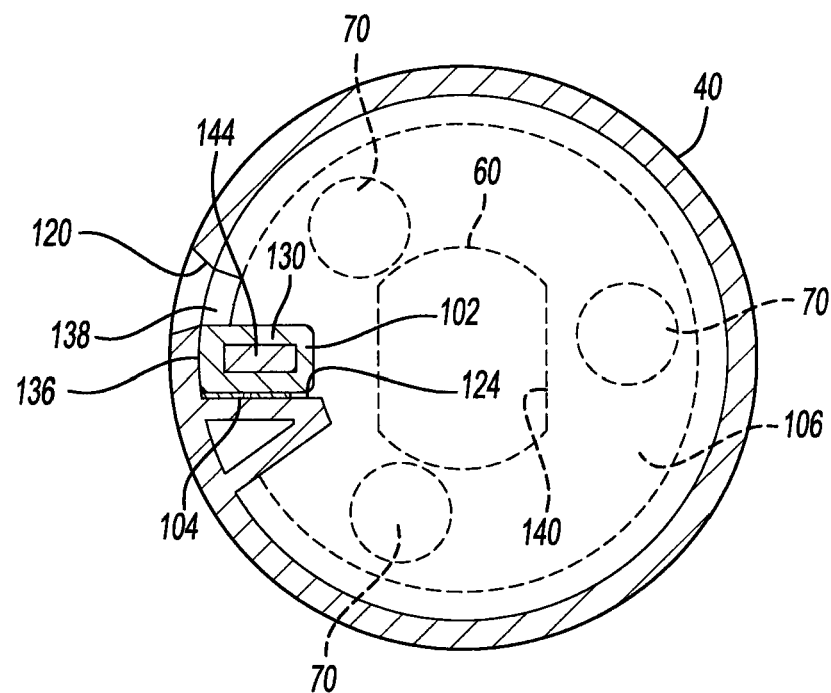
FIG. 6 is a cross-sectional view of the indicator mechanism of FIG. 5 and shown with the indicator mechanism in a second position corresponding to a clamped position.

According to the present configuration, the compression member 104 can be designed to compress from the position shown in FIG. 5 to the position shown in FIG. 6 upon a compressive force that corresponds to a suitable clamping force on the drill bit 52. Other configurations may be used where multiple Belleville washers are stacked end to end. It will be appreciated that a user is permitted to apply additional clamping force onto the drill bit 52 even after the compression member 104 has collapsed to the position shown in FIG. 6. However, the indicator mechanism 100 can be configured to rotate the visual indicator member 102 into the position shown in FIG. 4 once a satisfactory amount of torque has been applied onto the drill bit 52.

In one example, once a user has tightened the drill chuck 10 to the clamped position (FIG. 4) and the second visual indicator 138 has been revealed through the viewing window 120, a user can release grip from the rear sleeve 40. Releasing grip on the rear sleeve 40 can cause the compression member 104 to return to its uncompressed state (FIG. 5) and therefore cause the visual indicator member 102 to return to the position shown in FIGS. 3 and 5 where the first visual indicator 136 is shown through the viewing window 120. Other configurations are contemplated where the indicator mechanism 100 would maintain the visual indicator member 102 in the position shown in FIGS. 4 and 6 even after a user removes grip from the rear sleeve 40. It is contemplated that in one example, the indicator mechanism 100 can reset to the unclamped position (FIGS. 3 and 5) upon initially manually rotating the front sleeve 38 toward the loosening direction (clockwise as viewed in FIG. 4) while maintaining the rear sleeve 40 in a static position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power tool comprising;
a housing having a handle and a body portion;
a motor disposed in the body portion;
a drive spindle drivingly connected to the motor;
a chuck comprising:
a chuck spindle that supports a plurality of chuck jaws;
a first sleeve that rotationally communicates with the chuck jaws and moves the chuck jaws between a clamping position and a non-clamping position; and
an indicator mechanism disposed on the chuck, the indicator mechanism including a visual indicator member, the visual indicator member having a first visual indicator and a second visual indicator, wherein the chuck defines a third visual indicator, and the visual indicator member moves relative to the third visual indicator from a first position to a second position only upon rotation of the first sleeve until a predetermined clamping force is attained by the chuck jaws.

2. The power tool of claim 1 wherein the indicator mechanism further comprises a plate that is keyed for rotation with the chuck spindle and that is fixed for movement with the visual indicator member.

3. The power tool of claim 2 wherein the plate has a tab extending therefrom that couples with the visual indicator member.

4. The power tool of claim 3 wherein the chuck further comprises a second sleeve axially offset relative to the first sleeve.

5. The power tool of claim 4 wherein the second sleeve defines the third visual indicator, and the third visual indicator includes a window for viewing the visual indicator member.

6. The power tool of claim 4, wherein the indicator mechanism further comprises a compression member that is movable between an uncompressed position and a compressed position, the compression member disposed between a support wall of the second sleeve and the tab of the plate, wherein movement of the indicator member from the first position to the second position corresponds to movement of the compression member from the uncompressed position to the compressed position.

7. The power tool of claim 6 wherein the compression member comprises a Belleville washer.

8. The power tool of claim 1 wherein the first visual indicator is a first color and the second visual indicator is a second color that is distinct from the first color.

9. The power tool of claim 8 wherein the first and second visual indicators are formed on a unitary visual indicator member.

10. A chuck comprising:
a chuck spindle that supports a plurality of chuck jaws;
a first sleeve that rotationally communicates with the chuck jaws and moves the chuck jaws between a clamping position and a non-clamping position; and
an indicator mechanism disposed on the chuck, the indicator mechanism including a visual indicator member, the visual indicator member having a first visual indicator and a second visual indicator, wherein the chuck defines a third visual indicator and the visual indicator member moves from a first position relative to the third visual indicator to a second position upon application of a predetermined torque on the first sleeve, the predetermined torque being achieved only upon application of a predetermined clamping force of the chuck jaws.

11. The chuck of claim 10, further comprising a second sleeve axially offset relative to the first sleeve and that defines the third visual indicator, the third visual indicator including a window for viewing the visual indicator member.

12. The chuck of claim 11 wherein the indicator mechanism further comprises a plate that is keyed for rotation with the chuck spindle and that is fixed for movement with the visual indicator member.

13. The chuck of claim 12 wherein the plate has a tab extending therefrom that couples with the visual indicator member.

14. The chuck of claim 13 wherein the indicator mechanism further comprises a compression member that is movable between an uncompressed position and a compressed position, the compression member disposed between a support wall of the second sleeve and the tab of the plate, wherein movement of the indicator member from the first position to the second position corresponds to movement of the compression member from the uncompressed position to the compressed position.

15. The chuck of claim 10 wherein the first visual indicator is a first color and the second visual indicator is a second color that is distinct from the first color.

16. The chuck of claim 15 wherein the first and second visual indicators are formed on a unitary visual indicator member.

17. A power tool comprising:
a housing having a handle and a body portion;
a motor disposed in the body portion;
a drive spindle drivingly connected to the motor;
a chuck comprising:
  a chuck spindle that supports a plurality of chuck jaws;
  a first sleeve that rotationally communicates with the chuck jaws and moves the chuck jaws between a clamping position and a non-clamping position;
  an indicator mechanism disposed on the chuck, the indicator mechanism including a visual indicator member and a plate, the visual indicator member having a first visual indicator and a second visual indicator, the late including a tab extending therefrom that couples with the visual indicator member, wherein the plate is keyed for rotation with the chuck spindle and is fixed for movement with the visual indicator member;
  a second sleeve axially offset from the first sleeve that defines a window for viewing the visual indicator member, wherein the visual indicator member moves relative to the window from a first position to a second position upon rotation of the first sleeve to a location that corresponds to a predetermined clamping force attained by the chuck jaws; and
  a compression member that is movable between an uncompressed position and a compressed position, the compression member disposed between a support wall of the second sleeve and the tab of the plate, wherein movement of the indicator member from the first position to the second position corresponds to movement of the compression member from the uncompressed position to the compressed position, and the compression member moves from the uncompressed position to the compressed position upon the chuck jaws attaining a predetermined clamping force.

18. The power tool of claim 17 wherein the compression member comprises a Belleville washer.

19. The power tool of claim 18 wherein the first visual indicator is a first color and the second visual indicator is a second color that is distinct from the first color.

* * * * *